United States Patent [19]

Takagi et al.

[11] Patent Number: 4,647,781
[45] Date of Patent: Mar. 3, 1987

[54] GAMMA RAY DETECTOR

[75] Inventors: Kazumasa Takagi, Tokyo; Tokuumi Fukazawa, Tachikawa, both of Japan

[73] Assignee: Hitachi Chemical Company, Ltd., Tokyo, Japan

[21] Appl. No.: 787,076

[22] Filed: Oct. 15, 1985

Related U.S. Application Data

[63] Continuation of Ser. No. 462,227, Jan. 31, 1983, abandoned.

[51] Int. Cl.$^4$ ............................................... G01J 1/58
[52] U.S. Cl. ............................... 250/483.1; 250/361 R
[58] Field of Search ............ 250/483.1, 486.1, 361 R; 252/301.4 F; 313/468

[56] References Cited

FOREIGN PATENT DOCUMENTS

| 2155077 | 5/1973 | Fed. Rep. of Germany ... 252/301.4 F |
| 2202485 | 8/1973 | Fed. Rep. of Germany ... 252/301.4 F |
| 565883 | 6/1979 | Japan ............................ 252/301.4 F |

*Primary Examiner*—Carolyn E. Fields
*Assistant Examiner*—Richard Hanig
*Attorney, Agent, or Firm*—Antonelli, Terry & Wands

[57] ABSTRACT

A gamma ray detector suitable for use in a positron CT and others is disclosed which comprises a scintillator formed of a single crystal of cerium activated gadolinium silicate which is expressed by a general formula $Gd_{2(1-x-y)}Ln_{2x}Ce_{2y}SiO_5$ (where Ln indicates at least one element selected from a group consisting of yttrium and lanthanum, and x and y lie in ranges given by formulae $0 \leq x \leq 0.5$ and $1 \times 10^{-3} \leq y \leq 0.1$).

8 Claims, 1 Drawing Figure

GAMMA RAY DETECTOR

This is a continuation of application Ser. No. 462,227, filed Jan. 31, 1983 now abandoned.

BACKGROUND OF THE INVENTION

The present invention relates to a gamma ray detector suitable for use in a positron CT (namely, a positron computed tomography scanner) for measuring the distribution of a positron emitting nuclide injected into a human body.

When a positron comes to rest in matter, it is quickly annihilated by an electron into a pair of photons, namely, gamma rays. Gamma ray detectors used in a positron CT detect such gamma rays, and are usually made up of single crystal scintillators of bismuth germanate $Bi_4Ge_3O_{12}$ (hereinafter referred to as "BGO") and a photomultipliers. The bismuth germanate BGO has an effective atomic number of 74, a density of 7.1 g/cm³, and a large absorption coefficient for gamma rays (of 511 KeV). Accordingly, a positron CT provided with the BGO scintillation is excellent in geometrical resolution. However, the luminescence decay constant of BGO is long, that is, is 300 ns (nano seconds), and therefore the time resolution of the positron CT is not good, that is, has a value of 3 to 4 ns. (Refer to an article by Katsumi Takami, appearing on page 122 of the Feb. 18, 1980 issue of Nikkei Electronics).

In order to improve the time resolution of the positron CT, the gamma ray detector is required to use a scintillator having a short luminescence decay constant.

SUMMARY OF THE INVENTION

It is accordingly an object of the present invention to provide a gamma ray detector including a scintillator which has a short luminescence decay constant and a large absorption coefficient for gamma rays.

In order to attain the above object, a gamma ray detector according to the present invention comprises a single crystal scintillator of cerium activated gadolinium silicate expressed by a general formula $Gd_{2(1-x-y)}Ln_{2x}Ce_{2y}SiO_5$ (where Ln indicates at least one element selected from a group consisting of Y and La, and x and y lie in ranges given by formulae $0 \leq x \leq 0.5$ and $1 \times 10^{-3} \leq y \leq 0.1$), and a photodetector for detecting luminescence from the scintillator.

DESCRIPTION OF THE PREFERRED EMBODIMENTS

Figure 1:
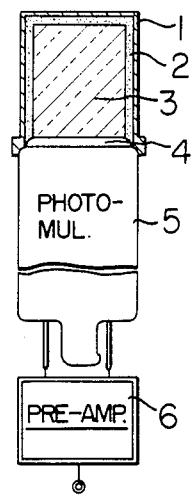
FIG. 1 is a diagrammatic sectional view showing an embodiment of a gamma ray detector according to the present invention.

FIG. 1 shows, in section, the outline of an embodiment of a gamma ray detector according to an embodiment of the present invention. Referring to FIG. 1, a reflecting material 2 such as $BaSO_4$ is preferably applied to the inner wall of an aluminum case 1, and then a scintillator 3 is inserted into the case 1. When gamma rays having passed through the aluminum case 1 impinge on the scintillator 3, light is generated therein. Light travelling in directions toward the aluminum case 1 is reflected from the reflecting material 2. Preferably, the scintillator 3 is optically coupled with a photomultiplier 5 through a material having a refractive index more than 1(one) such as silicone grease, to prevent the reflection of light at the interface between the scintillator and the incident window of th photomultiplier. A preamplifier 6 amplifies the output of the photomultiplier 5.

It has been known that phosphors $Y_2SiO_5$, $Y_3Al_5O_{12}$ and $YAlO_3$ each activated with $Ce^{3+}$ have a short luminescence decay constant. However, these materials have a small absorption coefficient for gamma rays, since each of them is made up of light elements. When a scintillator made of these materials is used in a positron CT, the geometrical resolution of the positron CT is extremely deteriorated. This is because the mass absorption coefficient of an element for gamma rays is proportional to $\rho Z^5$ (where $\rho$ indicates the density of the element and Z the atomic number thereof). In view of the above fact, gadolinium has been selected as a main component of phosphors, since gadolinium has a large atomic number, scarcely absorbs luminescent light generated in the phosphors and moreover can be replaced by cerium. A large number of cerium activated gadolinium compounds have been made, and single crystals of these compounds have been grown. Further, each of scintillators formed of these single crystals has been examined. Thus, it has been found that a scintillator made of $Gd_2SiO_5:Ce^{3+}$ exhibits luminescence at room temperature and moreover has a short luminescence decay constant. Therefore, a positron CT provided with a gamma ray detector including the above scintillator has been excellent in both of time resolution and geometrical resolution.

Now, the present invention will be explained below on the basis of embodiments thereof.

EMBODIMENT 1

A single crystal was grown in the following manner. Raw material powders of $Gd_2O_3$, $Ce_2O_3$ and $SiO_2$ were weighed out for a sintered material having a composition $Gd_{1.99}Ce_{0.01}SiO_5$. These raw material powders were mixed with each other, and then pressed in the form of a pellet. When, sintering was carried out at 1400° C. for 3 hours. Unreacted $Gd_2O_3$ was left only a little in the sintered material. Thereafter, 300 g of the sintered material was put in an iridium crucible having a diameter of 50 mm and a depth of 40 mm, and then melted by RF (radio frequency) heating. The iridium crucible was used for the reason that the melting point of the sintered material was high (that is, 1800° C.). A single crystal was grown from the melt in an atmosphere of nitrogen, to prevent the oxidation of the crucible. The decomposition and vaporization of the melt were not observed even in the nitrogen atmosphere.

Thus, a single crystal having a diameter of 25 mm and a length of 50 mm was grown. Further, the a plane (namely, the (100) crystallographic plane) of the single crystal was not only the habit plane but also the cleavage plane. The characteristics of a scintillator formed of this single crystal are shown in the following table, together with those of a scintillator made of each of BGO, CsF and NaI.

TABLE 1

| substance | $\eta^*$ | $\rho$ (g/cm$^3$) | Z | $\tau$ (nano sec) | luminescence wavelength (nm) | $F \times 10^5$ | solubility in water |
|---|---|---|---|---|---|---|---|
| Gd$_2$SiO$_5$:Ce | 16 | 6.7 | 58 | 60 | 430 | 12,773 | insoluble |
| Bi$_4$Ge$_3$O$_{12}$ (namely, BGO) | 12 | 7.1 | 74 | 300 | 480 | 6,302 | insoluble |
| CsF | 6 | 4.6 | 53 | 5 | 390 | 23,084 | hygroscopic |
| NaI (Tl) | 100 | 3.7 | 50 | 250 | 415 | 4,625 | hydroscopic |

In Table 1, $\eta^*$ indicates a scintillation efficiency in the case where the scintillation efficiency of the scintillator made of NaI is expressed by 100, $\rho$ a density, Z an effective atomic number, $\tau$ a luminescence decay constant, and F a figure of merit given by an equation $F = \rho Z^5 \eta^* / \tau$ which is our own standard.

As is apparent from Table 1, the scintillator used in the present invention is high in scintillation efficiency, large in effective atomic number, shorter in luminescence decay constant than the scintillator made of BGO, and therefore twice larger in figure of merit than the BGO scintillator.

The time resolution of a positron CT provided with the above scintillator was increased to 1 ns. As a result, the time window became narrow, and thus the following advantages were obtained.

(1) The frequency of accidental coincidence was decreased. Accordingly, picture images became distinct and measurements were carried out more precisely.

(2) It became possible to inject various radionuclides into a human body, as far as the amount of injected radionuclide was less than a permissible dose.

(3) Owing to the rapid response of the gamma ray detector, changes in the concentration of injected radionuclide were detected every moment, and thus dynamic measurements were carried out very well.

EMBODIMENT 2

A single crystal was made of Ce$_{0.01}$Gd$_{1.00}$La$_{0.99}$SiO$_5$ which was obtained by substituting lanthanum La for half of gadolinium of Ce$_{0.01}$Gd$_{1.99}$SiO$_5$. That is, predetermined amounts of oxides Ce$_2$O$_3$, Gd$_2$O$_3$, La$_2$O$_3$ and SiO$_2$ were weighed out, mixed with each other, and then sintered to obtain a raw sintered material of Ce$_{0.01}$Gd$_{1.00}$La$_{0.99}$SiO$_5$. Each of the raw material fabrication process and the single crystal growth process was the same process as in the growth of the single crystal of Ce$_{0.01}$Gd$_{1.99}$SiO$_5$. The meltng point of the composition Ce$_{0.01}$Gd$_{1.00}$La$_{0.99}$SiO$_5$ was 1820° C., and therefore was higher than that of the composition Ce$_{0.01}$Gd$_{1.99}$SiO$_5$ by about 20° C. The grown single crystal of Ce$_{0.01}$Gd$_{1.00}$La$_{0.99}$SiO$_5$ had substantially the same luminescence properties (namely, the luminescence decay constant and the wavelength of luminescence) as the single crystal of Ce$_{0.01}$Gd$_{1.99}$SiO$_5$, but was only 1.1 times higher in luminescence intensity than a single crystal of BGO, that is, lower in luminescence intensity than the single crystal of Ce$_{0.01}$Gd$_{1.99}$SiO$_5$. This is because a single crystal of Ce$_{0.01}$Gd$_{1.00}$La$_{0.99}$SiO$_5$ is grown from a solid solution and thus a void capable of scattering or absorbing luminescent light is generated in the single crystal.

Since gadolinium silicate Gd$_2$SiO$_5$ has a large effective atomic number and a high density, it is excellent as the host material of cerium activator. Further, as mentioned above, it is possible to substitute yttrium or lanthanum for part of gadolinium of the gadolinium silicate. However, in the case where yttrium is substituted for more than half of gadolinium of gadolinium silicate, the silicate thus formed has the same effective atomic number (namely, 53) as the phosphor CsF, and moreover becomes low in density. Thus, when a scintillator made of this silicate is employed in a positron CT, the geometrical resolution thereof is reduced. That is, the above-mentioned silicate cannot be used in a positron CT. In view of the above-mentioned fact, it is preferable that a silicate containing only gadolinium or both of gadolinium and lanthanum is used to form a single crystal.

However, as mentioned in EMBODIMENT 2, the substitution of lanthanum for part of gadolinum of gadolinium silicate results in the growth of single crystal of a solid solution, and thus there arise the following problems, that is, (1) defects are readily generated in the single crystal, and (2) the growth rate of single crystal has to be made slow. Further, when lanthanum is substituted for gadolinium of gadolinium silicate, the silicate obtained becomes smaller in effective atomic number than gadolinium silicate. In view of these facts, it is preferable that lanthanum is substituted for not more than half of gadolinium of gadolinium silicate.

On the other hand, the amount of cerium substituted for gadolinium of the above-mentioned silicates was varied in a range from 0.2 to 10 atomic percent of gadolinium. In this range, the luminescence decay constant of the silicates was unchanged. However, when the amount of cerium was large, single crystals of the silicates become light brown color, and the transparency of each crystal was deteriorated. Accordingly, when the general formula Gd$_{2(1-x-y)}$Ln$_{2x}$Ce$_{2y}$SiO$_5$ is used to indicate the above-mentioned silicates, it is especially preferable that the value of y is put in a range given by a formula $1 \times 10^{-3} \leq y \leq 0.05$.

As has been explained in the foregoing description, when a positron CT is provided with a single crystal scintillator of cerium activated gadolinium silicate expressed by a general formula Gd$_{2(1-x-y)}$Ln$_{2x}$Ce$_{2y}$SiO$_5$ (where Ln indicates one of yttrium, lanthanum and a mixture thereof, and x and y lie in ranges given by formulae $0 \leq x \leq 0.5$ and $1 \times 10^{-3} \leq y \leq 0.1$), the positron CT can produce more distinct picture images and perform more precise measurements, as compared when a conventional BGO scintillator is employed in the positron CT. Further, when the scintillator of the gadolinium silicate is employed, the time resolution of the positron CT is increased, and thus dynamic measurements can be carried out in a more favorable manner.

What is claimed is:

1. A gamma ray detector comprising:
   a scintillator formed of a single crystal of cerium activated gadolinium silicate, said cerium activated gadolinium silicate being given by a general formula Gd$_{2(1-y)}$Ce$_{2y}$SiO$_5$ (where y lies in a range given by formula $1 \times 10^{-3} \leq y \leq 0.1$); and
   a photodetector for detecting light from said scintillator.

2. A gamma ray detector according to claim 1, wherein said y in said general formula lies in a range given by a formula $1 \times 10^{-3} \leq y \leq 0.05$.

3. A gamma ray detector for use in positron CT, comprising:

a scintillator unit including a single crystal of the formula: $Gd_{2(1-y)}Ce_{2y}SiO_5$ wherein $1 \times 10^{-3} \leq y \leq 0.1$ for receiving gamma rays and emitting luminescence of wavelength 430 mm;

a photodetector for detecting said luminescence and generating an electric signal; and means for amplifying said electric signal.

4. A gamma ray detector for use in positron CT according to claim 3, wherein said scintillator unit has a luminescence decay constant of 60 nanoseconds.

5. A gamma ray detector for use in positron CT according to claim 4, wherein said photodetector includes a photomultiplier.

6. A gamma ray detector for use in positron CT according to claim 3, wherein said scintillator unit includes an aluminum case for accommodating said single crystal, which case has an aperture coupled to said photodetector.

7. A gamma ray detector for use in positron CT according to claim 6, wherein said aluminum casing is provided with a reflective coating on the interior surfaces whereby, upon the gamma rays having passed through the aluminum casing, light is generated within said single crystal scintillator and the light is reflected from said coating and is transmitted through the single crystal to the photodetector via said aperture.

8. A gamma ray detector for use in positron CT according to claim 3, wherein said single crystal has a (100) crystallographic plane at a surface.

* * * * *